Jan. 29, 1935.   F. C. MATTHAEI   1,989,486
APPARATUS FOR WELDING
Filed Nov. 10, 1930   2 Sheets-Sheet 1

INVENTOR
Broderick C. Matthaei
BY
ATTORNEYS

Jan. 29, 1935.  F. C. MATTHAEI  1,989,486
APPARATUS FOR WELDING
Filed Nov. 10, 1930  2 Sheets-Sheet 2
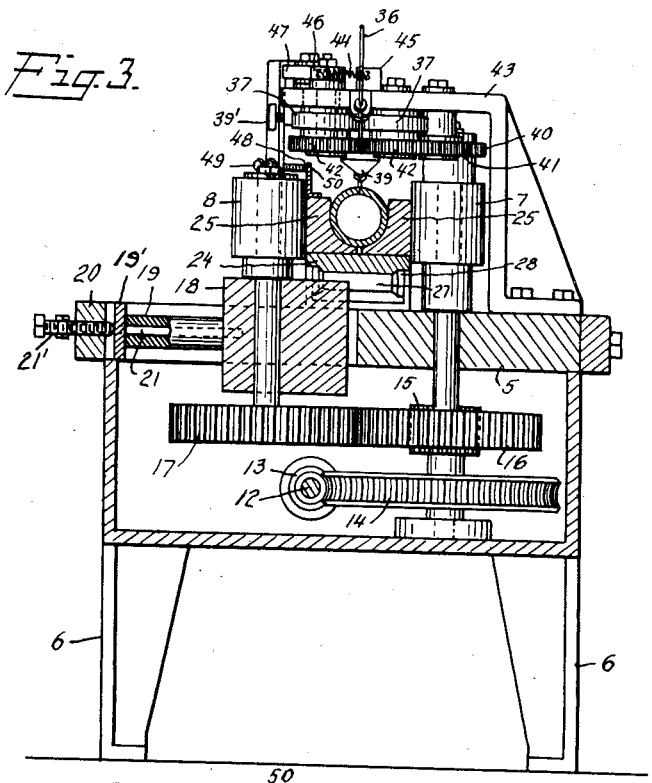
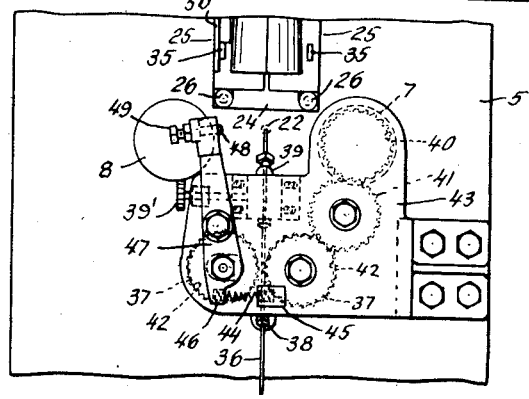
INVENTOR
Frederick C. Matthaei
BY
ATTORNEYS Patented Jan. 29, 1935

1,989,486

UNITED STATES PATENT OFFICE 1,989,486

APPARATUS FOR WELDING

Frederick C. Matthaei, Detroit, Mich.

Application November 10, 1930, Serial No. 494,755

8 Claims. (Cl. 219—4)

This invention relates to improvements in apparatus for welding, particularly the welding of tubular parts.

In the welding of the seams of metallic tubes with an oxy-acetylene torch or with a metallic or carbon arc, it is necessary to keep the seam edges in close abutment as the welding operation proceeds. This can be done quite readily when the tube blank is of uniform cross-section. But when it is desired to weld seams of tubular pieces of irregular cross-section, as, for instance, tapered tubes, it is not possible to use machines of the type commonly employed in welding uniform tubing, and for such irregular shapes, it has become customary to place each of the pieces to be welded in a jig or fixture provided with suitable clamping devices, then mount the fixture in position under the torch or arc, and then cause the torch or arc to travel at uniform speed along the length of the piece thus held in the fixture. Such operation is slow and expensive by reason of the time required for clamping the tubular parts in the fixture, mounting the fixture in position preparatory to welding, and removing the fixture containing the welded part, and also it is necessary, at least in the case of oxy-acetylene welding, to return the torch to initial position after each welding operation with consequent loss of the time which that return movement consumes.

This invention is concerned particularly with the welding of the seams of tubular parts of irregular shape, as, for instance, tapered tubes, and its object is to provide an improved method and apparatus for such welding whereby pieces may be welded much more rapidly and the cost of the welding operation greatly reduced. In accordance with the invention, a plurality of fixtures for the tubular parts are provided and these fixtures are moved successively along a prescribed path in coaction with a heating device, such as an oxy-acetylene torch or a carbon or metallic arc, mounted stationarily in position. By proceeding in this way, the fixtures containing the tubular parts may be passed under the heating device in a continuous succession so that little or no time is lost between successive welding operations. To facilitate this and decrease the number of fixtures that it is necessary to employ, means are provided for receiving a fixture containing a tube and moving it over a prescribed course which carries it from a starting position through the welding position and back to the starting position where the welded tube is removed and another tubular part is inserted in the fixture preparatory to starting the latter again on its course through the welding portion of the machine.

Preferably the fixtures are provided with parallel sides and they are arranged to be traversed through the machine by pairs of power-driven feeding-rollers which move the fixtures along in a straight line at a uniform speed. These feeding rollers are arranged to be pressed forcibly against the sides of each fixture so that they will serve to apply pressure to the tubular part within the fixture and thereby press the seam edges into that firm abutment which is desirable to facilitate effecting the weld.

When the heating action is procured by the oxy-acetylene or carbon arc processes, it is usually necessary to supply additional metal for fusing into the seam to be welded, and one method heretofore employed for supplying this additional metal has included attaching a strip of the metal to be added over the seam before the welding or fusing operation. In the present arrangement this is done automatically in a single operation, i. e., the additional metal is supplied immediately to the welding zone and fused into the seam without requiring anything in the nature of a preliminary attaching operation, whereby considerable expense, time and labor are saved. The wire is fed to the seam of the piece to be welded at the same rate of speed as the latter, and at an angle such that it lies substantially flat on the seam as the piece enters the heating zone where the wire is fused into the seam to form a smooth, uniform and strong weld. The wire feed is automatically controlled by the movement of the piece, being started at the beginning of the welding operation and stopped at the end, whereupon it awaits the next succeeding piece to be welded and the wire feeding operation is repeated. The automatic wire feed is so arranged as to accommodate welds of any length or welds of any number along a single piece to be welded.

These and other features of the invention will be better understood by reference to the following description taken in conjunction with the accompanying drawings which illustrate the preferred embodiment of the invention.

In these drawings, Figure 1 is an elevation of the machine;

Figure 3 is a transverse section on the line 3—3 of Figure 1;

Figure 4 is an enlarged view of the wire feeding mechanism; and

Figure 5 represents a tapered tubular part which is representative of the various kinds of tubular pieces for which the machine is especially adapted.

Figure 1:
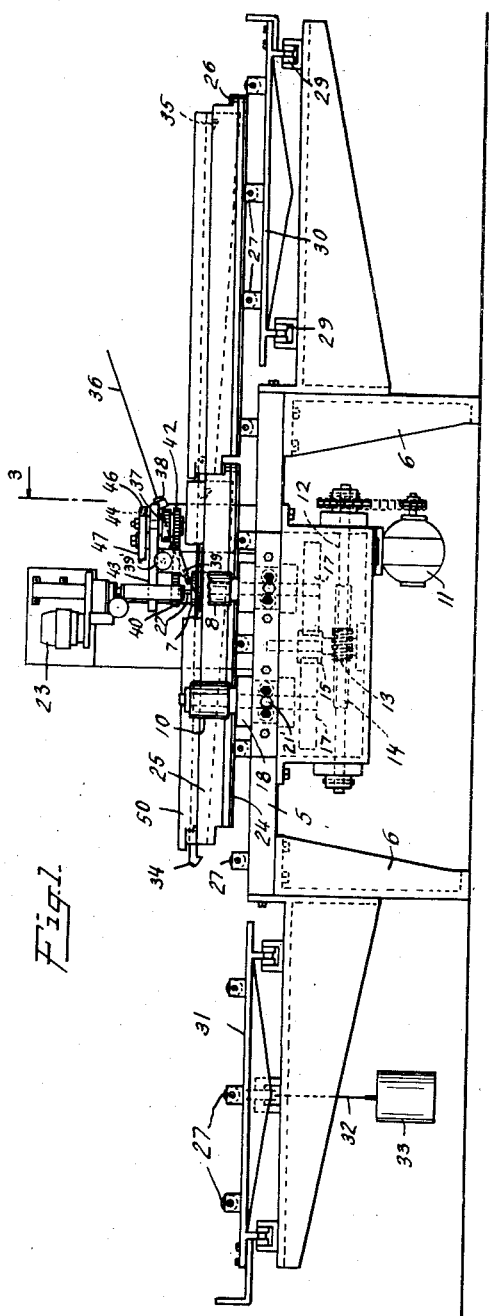

Referring to these drawings, 5 is a platform supported on legs 6 and having two pairs of feed-rollers 7 and 8 and 9 and 10 mounted above it on vertical axes. These four feed rollers are driven in unison by a motor 11 connected by a chain and sprocket gearing to a horizontal shaft 12 mounted in bearings below the table or platform 5 and carrying a worm gear 13. This worm gear meshes with a worm wheel 14 mounted on a vertical shaft carrying a pinion 15 which meshes with a pair of gears 16 on the shafts of the feed rollers 7 and 9. These two gears 16 mesh with similar gears 17 on the shafts of the feed rollers 8 and 10. The shafts of the rollers 7 and 9 are mounted in fixed bearings but the shafts of the rollers 8 and 10 are mounted in blocks 18 adapted to slide in ways formed in the table 5, the range of movement of these blocks 18 and the shafts carried thereby being very small. Throughout this lateral movement of the feed rollers 8 and 10, the gears 17 remain in mesh with the gears 16, the teeth of these coacting gears maintaining the required meshing relation throughout these lateral movements of the gears 17, which lateral movements need be of only a small magnitude. The blocks 18 are pressed forward yieldingly by rubber buffers 19 mounted between the blocks 18 and a frame member 20. Long threaded bolts 21 pass through the frame member 20 and the rubber buffers 19 and are secured at their inner ends to the blocks 18 to hold the several parts in position and limit the range of movement of the blocks 18. A set screw 21' passes through the frame member 20 and bears against plate 19', which engages rubber buffer 19, whereby the compression of the latter may be varied.

The heating member may be of any suitable construction. In this instance it is shown as an electrode 22 for producing an electric arc, a motor 23 being provided to rotate the electrode 22 continuously as the welding current flows from it to the tubular part to be welded. The welding current flows from the tube into the fixture in which it is held and into the frame of the machine which is grounded.

The part to be welded is mounted in a fixture having parallel sides. In this instance the machine is adapted for welding longitudinal seams of tapered tubular parts such as that shown in Fig. 5. The fixture for holding this part preferably consists of a base 24 and two side walls 25 pivotally mounted by their ends at 26 upon the base 24, as shown in Fig. 2, these two side walls 25 being shaped to hold the tubular part, and the pressure of the feeding rollers 7, 8, 9, and 10 upon the side walls 25 of the fixture being adequate to force the side walls together and thereby press the seam edges into abutment.

Figure 2:
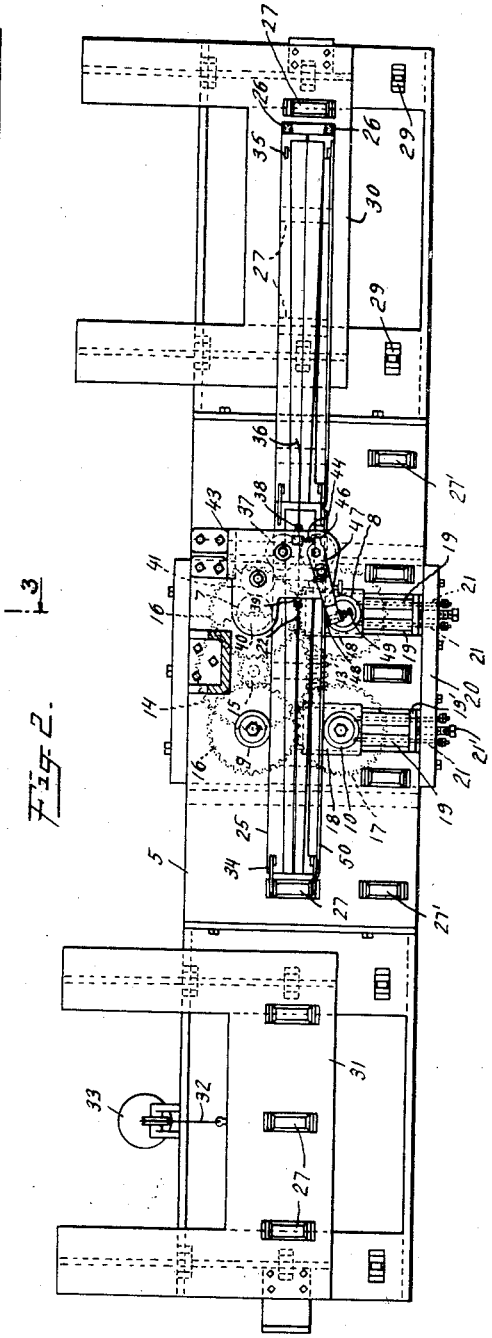
Figure 2 is a plan view thereof.

A plurality of these fixtures are provided and they are adapted to travel successively from right to left in a straight line between the pairs of feeding rollers, as seen in Fig. 2. To facilitate this movement of the fixtures, a plurality of horizontal supporting rollers 27 are mounted in a straight line upon the surface of the table 5. Each of these rollers 27 has small enlargements 28 (Figure 3) at its opposite ends and the bottom wall 24 of each fixture is shaped to correspond with these spool-shaped rollers 27 so that the fixtures will be guided thereby in their straight line movement.

At the right end of the machine are transverse ways 29 upon which is mounted a carriage 30 shaped as shown in Figure 2. On this carriage are mounted three or more of the rollers 27 and the carriage 30 is adapted to be moved to one or the other of two positions. In the position in which it is shown in Figure 2, its rollers 27 are in line with the rollers 27 mounted on the table 5. At the left end of the machine is a similar carriage 31 having rollers 27 mounted thereon. A cable 32 is attached to this carriage and passes over a pulley and has the weight 33 attached to its end. This weight normally holds the carriage 31 in the position in which it is shown in Figure 2 with the rollers 27 in line with the rollers 27 on the table 5. The carriage 31 may be rolled by hand to a forward position in which its rollers 27 are in alignment with a second series of rollers 27' mounted on the upper face of the platform 5.

Preferably each of the fixtures has one or a pair of pivoted latches 34 mounted at its forward end, and at its rear end, each fixture has notches 35 to receive these latches whereby each fixture may be latched to the end of the one preceding it and be drawn into the welding position by it, in the manner of a train.

Referring now to the automatic welding wire feed, which is adapted to be used when the oxyacetylene or carbon arc methods of heating are employed, Figs. 1, 2, and 4 illustrate a wire 36, drawn from a reel or spool suitably positioned but not shown, and fed to the seam of the piece to be welded at the rate of speed at which the piece moves. The wire 36 is guided by bushing 38 through the feed rolls 37 and a bushing 39 adjustable laterally by screw 39' directs it along the seam of the piece to be welded at such an angle as to cause the wire to lie flat along the seam immediately in front of the electrode 22 so as to be fused into the seam as the wire 36 and piece move together. The feed rolls 37 are driven by a spur gear 40 connected to the shaft of roll 7 through an idler gear 41 which drives one of the intermeshing gears 42 of the feed rolls 37. These gears, the feed rolls 37 and the bushings 38 and 39 are mounted on a bracket 43 secured to the platform 5 of the machine.

The two gears 42 of the wire feed rolls 37 are normally urged apart by a spring 44 seated at one end in a socket 45 on frame 43 and seated at its other end in a lug 46 mounted on the end of lever 47 pivoted upon frame 43 and carrying one of the wire feed rolls 37 and its driving gear 42. As shown in Fig. 3, the free end of the lever 47 carries the ball bearing 48 which is adjustable by screw 49 to project variable distances. Projecting upwardly from the corresponding side wall 25 of each welding fixture is a cam plate 50, which is adapted to be engaged by the ball bearing 48 of lever 47 to move it so that gears 42 are brought into mesh and feed rolls 37 are rotated to feed the wire 36 to the welding zone along the seam.

The operation of the machine and the method of welding practiced with it have been indicated by the foregoing but may be summarized as follows:

Each of the tubular pieces to be welded is mounted in one of the fixtures, bringing the sides 25 of the fixture together until they grip the tube firmly. Either before or after the tube is placed in the fixture, the latter is set upon the rollers 27 of the feeding table 30 which is brought into registry with the feed rolls 7 and 8. The fixture is then moved to the left over the rollers 27 of the table 5 until its forward end enters between the feeding rollers 7 and 8. These rollers are forced apart slightly and they press upon the opposite sides of the fixture with such force as to insure that the seam edges will be pressed tightly together. The feeding rollers are rotated from the motor 11 and feed the fixture along until it is gripped by the rollers 9 and 10 and thereafter the feeding movement is continued until the fixture emerges from the rollers 9 and 10. As the fixture is thus fed along, the cam plate 50 thereof engages ball bearing 48 of lever 47 and moves the latter about its pivot to cause gears 42 to mesh. This drives wire feed rolls 37 and the wire 36 is fed through bushing 39 to the seam of the piece at the rate of speed of the latter and at a point just ahead of the electrode 22, so that the wire 36 is continuously fused into the seam to form a smooth and secure weld. As cam plate 50 extends only to the end of the piece, ball bearing 48 of lever 47 drops off of the end thereof when the weld is finished, so that lever 47 is moved to disconnect wire feed rolls 37 and the wire 36 is fused off and remains stationary until the cam 50 of the next fixture repeats the operation. By making cam plates 50 any length or varying its shape, the wire feed may be stopped and started at any time.

As the fixture passes from between the last pair of feed rolls 9 and 10, it lies on rollers 27 of the carriage 31. The operator then lifts latches 34 out of the notches 35 of the next succeeding fixture, moves the carriage forward manually to bring the fixture in line with the rollers 27' whereupon the fixture is moved to the right and the carriage 30 is drawn forward with the result that the fixture is received upon the rollers 27 of the feeding carriage 30. As soon as the receiving carriage 31 is released, it is drawn back to its original position by the weight 33. At a convenient point in the travel of this fixture, the welded tubular part is removed from it; preferably removal of the tubular part takes place immediately after the fixture is received upon the carriage 31.

This method of welding is distinctive in that the articles to be welded are mounted in fixtures and those fixtures are caused to move in a predetermined path in coaction with a heating element such as a torch or arc which is mounted stationarily. By reason of this characteristic of the method, there is no return movement to be allowed for and the tubes may be passed through the welding zone one after another in a continuous succession and the welding wire is fed automatically as it is needed. To facilitate this continuous movement, each fixture may be temporarily attached to the next succeeding one as, for instance, by the hooks 34 referred to. In this way no time is lost between successive welding operations and there is a continuous feed of the seams to be welded under the heating element at a speed which is maintained uniform and up to the capacity of the heating element to adequately heat the metal. It will be noted also that the pressure for bringing the seam edges into the hard abutment required is produced by the means employed for feeding the fixtures through the machine. Thus the amount of hand work required in mounting the tubular parts in the fixtures is reduced to a minimum.

After the welding operation on a tubular part has been completed, the sides of the fixture are released by the pressure applying elements and the welded part can be removed from its fixture and the fixture started on its return movement well within the time consumed by the operation of welding the next succeeding part.

I claim:

1. A welding apparatus comprising the combination of a fixture for the part having a seam to be welded, means for feeding the fixture and the part therein, heating means for co-acting with the part to be welded as it is so fed, and means actuated by movement of the fixture for feeding a strip of metal to the seam in said part for fusion therein by said heating means.

2. A welding apparatus comprising the combination of a fixture for the part having a seam to be welded, a support, means on the support for feeding the fixture and the part therein, heating means on the support for co-acting with the part to be welded as it is so fed, means on the support for feeding a strip of metal to the seam in said part for fusion therein by said heating means, and means actuated by the fixture for controlling said strip feeding means.

3. A welding apparatus comprising the combination of a fixture for the part having a seam to be welded, means for feeding the fixture and the part therein, heating means for co-acting with the part to be welded as it is so fed, means for feeding a strip of metal to the seam in said part for fusion therein by said heating means, and means engaged by said fixture for controlling the operation of said strip feeding means.

4. A welding apparatus, comprising the combination of a fixture for holding the parts to be welded together, stationary heating means, means for feeding the fixture past the heating means and simultaneously applying pressure to the fixture for urging together the parts to be welded, and means actuated by the movement of the fixture for feeding a strip of metal to the seam of the parts to be welded for fusion therein by said heating means.

5. A welding apparatus comprising the combination of a fixture for holding the parts to be welded, means for advancing the fixture past the welding station, normally inactive means for feeding a strip of metal to the seam, and means actuated by the fixture for controlling said strip feeding means to feed the strip to the seam at the beginning of the welding operation and stop the strip feed at the end of the welding operation.

6. A welding apparatus comprising in combination a table, a plurality of fixtures thereon, coupling means on said fixtures for connecting them together in end-to-end relation, a welding means adjacent said table, and relatively stationary driving means engaging successive fixtures for advancing said fixtures successively past the welding means in said end-to-end relation.

7. In a welding apparatus comprising in combination, a table, substantially parallel rows of supporting members on the table, a fixture for holding a part to be welded, welding apparatus adjacent one of the rows of supporting members for cooperation with a part to be welded supported in its fixture on the said one row, and a carriage on the table movable into alignment with one end of either row of supporting members for transferring the fixture from one row to the other.

8. In a welding apparatus comprising in combination, a table, substantially parallel rows of supporting members on the table, a fixture for holding a part to be welded, welding apparatus adjacent one of the rows of supporting members for cooperation with a part to be welded supported in its fixture on the said one row, and a carriage on at least one end of the table movable transversely of the corresponding ends of the rows of supporting members for receiving a fixture from one of the rows and transferring it into alignment with the other row.

FREDERICK C. MATTHAEI